(12) United States Patent
Higashiura et al.

(10) Patent No.: US 10,199,785 B2
(45) Date of Patent: Feb. 5, 2019

(54) ADAPTER FOR A POWER OUTLET AND A POWER PLUG

(71) Applicant: FUJI ELECTRIC WIRE INDUSTRIES CO., LTD., Osaka (JP)

(72) Inventors: Takashi Higashiura, Osaka (JP); Masaaki Yamamoto, Osaka (JP)

(73) Assignee: FUJI ELECTRIC WIRE INDUSTRIES CO., LTD., Osaka (JP)

( * ) Notice: Subject to any disclaimer, the term of this patent is extended or adjusted under 35 U.S.C. 154(b) by 0 days.

(21) Appl. No.: 15/709,654

(22) Filed: Sep. 20, 2017

(65) Prior Publication Data

US 2018/0083402 A1  Mar. 22, 2018

(30) Foreign Application Priority Data

Sep. 21, 2016 (JP) ................................. 2016-183805

(51) Int. Cl.
| H01R 31/06 | (2006.01) |
| H01R 33/06 | (2006.01) |
| H01R 13/652 | (2006.01) |
| H01R 33/94 | (2006.01) |
| B60L 11/18 | (2006.01) |
| H01R 13/629 | (2006.01) |
| H01R 24/54 | (2011.01) |
| H01R 13/627 | (2006.01) |

(52) U.S. Cl.
CPC .......... *H01R 33/06* (2013.01); *B60L 11/1818* (2013.01); *H01R 13/652* (2013.01); *H01R 31/06* (2013.01); *H01R 33/94* (2013.01); *B60Y 2200/91* (2013.01); *B60Y 2200/92* (2013.01); *B60Y 2300/91* (2013.01); *H01R 13/629* (2013.01); *H01R 13/6275* (2013.01); *H01R 24/54* (2013.01); *H01R 2201/26* (2013.01); *Y02T 10/7005* (2013.01); *Y02T 10/7072* (2013.01); *Y02T 90/14* (2013.01)

(58) Field of Classification Search
CPC .. H01R 2201/26; H01R 31/06; H01R 13/629; H01R 24/54; H01R 33/94; H01R 2105/00
USPC .................. 439/105, 34, 638, 655, 310, 106
See application file for complete search history.

(56) References Cited

U.S. PATENT DOCUMENTS 4,386,333 A * 5/1983 Dillan ..................... H01F 29/00
336/107
5,955,701 A * 9/1999 Schockner ........... H01R 13/629
174/66

(Continued)

FOREIGN PATENT DOCUMENTS

| JP | 4206119 B | 1/2009 |
| JP | 2012-169176 A | 9/2012 |

*Primary Examiner* — Abdullah A Riyami
*Assistant Examiner* — Justin M Kratt
(74) *Attorney, Agent, or Firm* — Nakanishi IP Associates, LLC

(57) ABSTRACT

An adapter is placed between a power outlet and a power plug to electrically connect them. The adapter includes a pair of blade slots and a pair of terminal slots arranged in correspondence with a pair of blades and a pair of earth terminals protruding from a power plug. The pair of blade slots is arranged on a first reference line passing through a center of an adapter body in a radial direction, and is arranged laterally symmetrical with respect to a second reference line. The pair of terminal slots is arranged on the second reference line, and is arranged vertically symmetrical with respect to the first reference line.

7 Claims, 12 Drawing Sheets

L ... longitudinal direction
1 ... adapter
2 ... adapter body
3, 4 ... core
5 ... outer shell
21 ... blade
22 ... earth terminal
24 ... blade slot
25 ... terminal slot
28 ... counter mating part
29 ... ridge
30 ... inner wall abutment
31 ... protrusion
32 ... lock bar
32a ... tab

(56) References Cited

U.S. PATENT DOCUMENTS

| | | | |
|---|---|---|---|
| 6,247,941 B1* | 6/2001 | Lee | H01R 13/652 439/103 |
| 8,753,149 B2* | 6/2014 | Lee | H01R 27/02 439/653 |
| 9,455,542 B2* | 9/2016 | Gaither | H01R 31/06 |

* cited by examiner

FIG. 1A

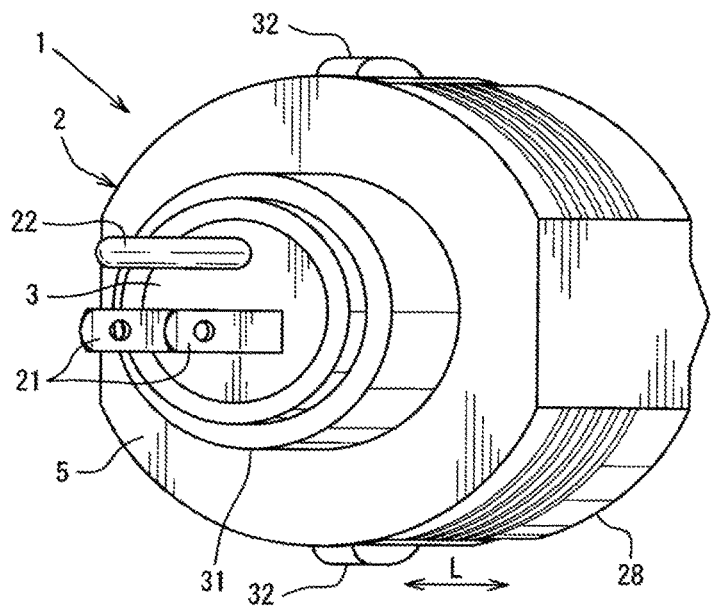

L ... longitudinal direction
1 ... adapter
2 ... adapter body
3, 4 ... core
5 ... outer shell
21 ... blade
22 ... earth terminal
24 ... blade slot
25 ... terminal slot
28 ... counter mating part
29 ... ridge
30 ... inner wall abutment
31 ... protrusion
32 ... lock bar
32a ... tab

FIG. 1B

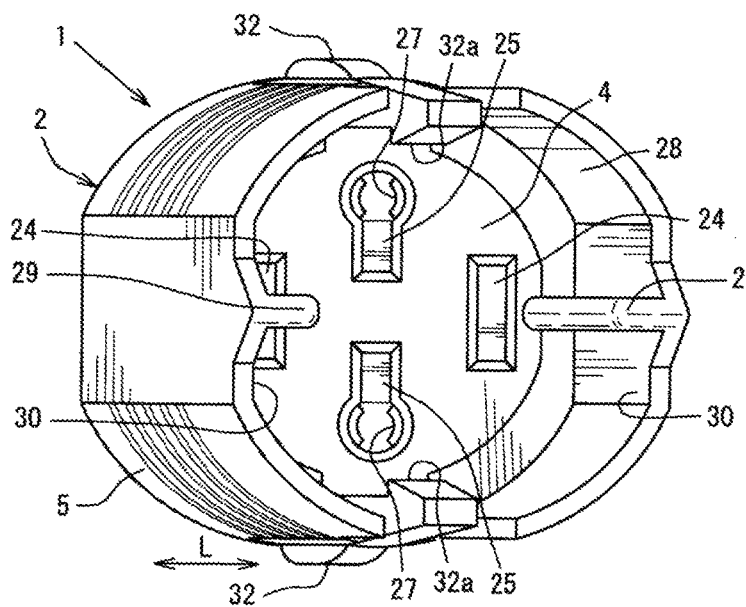

L ... longitudinal direction
1 ... adapter
2 ... adapter body
3, 4 ... core
5 ... outer shell
21 ... blade
22 ... earth terminal
24 ... blade slot
25 ... terminal slot
28 ... counter mating part
29 ... ridge
30 ... inner wall abutment
31 ... protrusion
32 ... lock bar
32a ... tab 1 ... adapter
2 ... adapter body
3 ... core
5 ... outer shell
21 ... blade
22 ... earth terminal
31 ... protrusion
32 ... lock bar
P ... center
R ... radial direction 1 ... adapter
2 ... adapter body
4 ... core
5 ... outer shell
24 ... blade slot
25 ... terminal slot
28 ... counter mating part
29 ... ridge
30 ... inner wall abutment
32 ... lock bar
32a ... tab
P ... center
R ... radial direction
T ... second reference line
Y ... first reference line

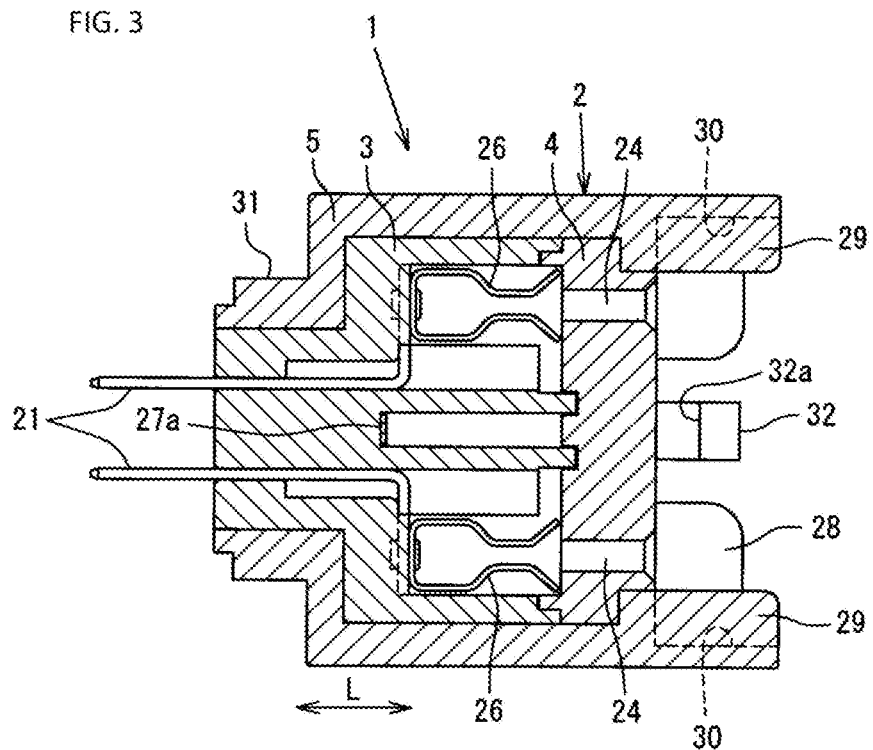

L ... longitudinal direction
1 ... adapter
2 ... adapter body
3, 4 ... core
5 ... outer shell
21 ... blade
22 ... earth terminal
25 ... terminal slot
27 ... terminal receiver fitting
28 ... counter mating part
29 ... ridge
30 ... inner wall abutment
31 ... protrusion
32 ... lock bar
32a ... tab
33 ... coil spring L ... longitudinal direction
1 ... adapter
2 ... adapter body
3, 4 ... core
5 ... outer shell
6 ... screw
21 ... blade
22 ... earth terminal
25 ... terminal slot
27 ... terminal receiver fitting
28 ... counter mating part
30 ... inner wall abutment
31 ... protrusion
32 ... lock bar
32a ... tab

| B ... power outlet | A ... power plug | 1 ... adapter | 28 ... counter mating part |
| B1 ... blade slot | Aa ... plug body | 2 ... adapter body | 29 ... ridge |
| B2 ... terminal slot | A7 ... mating part | 3 ... core | 30 ... inner wall abutment |
| B3 ... protrusion-receiving recess | A8 ... groove | 5 ... outer shell | 31 ... protrusion |
| | A9 ... outer wall abutment | 21 ... blade | 32 ... lock bar |
| | | 22 ... earth terminal | 32a ... tab |

ADAPTER FOR A POWER OUTLET AND A POWER PLUG

BACKGROUND OF INVENTION

Field of the Invention

The present invention relates to an adapter for connecting a power plug of a charging cable used for supplying electric power to an electric propulsion vehicle, such as an electric vehicle or a hybrid vehicle, to a power outlet of a power supply unit.

Background Art

The electric propulsion vehicle described above can be currently charged using one of two major types of infrastructure, namely, a residential charging station and a public charging station. Although residential charging, which supplies electric power to an electric propulsion vehicle using a charging cable, is more convenient for a user, the power plug of the charging cable may be unfit in the power outlet at the residential charging station, and may thus need a plug adapter for connecting to the power outlet.

A wide variety of such adapters are available, including an adapter described in Patent Literature 1. The adapter described in Patent Literature 1 includes a pair of blades and an earth terminal protruding from one end of the adapter. The pair of blades and the earth terminal are inserted into a pair of blade slots and a terminal slot formed in the power outlet. A pair of blades and an earth terminal protruding from a power plug described in, for example, Patent Literature 2 are then inserted into a pair of blade slots and a terminal slot formed in the other end of the adapter.

When a power outlet has a terminal slot in a bottom part of its plug-in surface, the adapter is plugged in the power outlet with its earth terminal being downward and then the power plug is plugged in the adapter with its earth terminal being downward. When, for example, a power plug has a cable connected to a peripheral portion of the power plug that is opposite to where the earth terminal protrudes, and extending orthogonal to the protruding direction of the earth terminal, the power plug plugged in the adapter with its earth terminal being downward can have its cable bent downward. A wire contained in the bent portion of the cable can break, or the electrical resistance in the bent portion of the wire can increase.

The cable has a large weight, and applies a large load to the power plug. The power plug can be unintentionally disconnected from the adapter and can fall, or the adapter can be unintentionally disconnected from the power outlet and can fall. The power plug and the adapter may not remain connected in a stable manner. The disconnected power plug can fall and receive impact, and consequently have its blades deformed or bent easily. The power plug may no longer be connectable.

CITATION LIST

Patent Literature

Patent Literature 1: Japanese Patent No. 4206119
Patent Literature 2: Japanese Unexamined Patent Application Publication No. 2012-169176

SUMMARY OF INVENTION

One or more aspects of the present invention are directed to an adapter to be placed between a power outlet and a power plug to electrically connect the power outlet and the power plug.

One aspect of the present invention provides an adapter including an adapter body to be placed between a power outlet and a power plug to electrically connect the power outlet and the power plug, a pair of blades and an earth terminal protruding from a first end of the adapter body in correspondence with a pair of blade slots and a terminal slot formed in the power outlet, and a pair of blade slots and a pair of terminal slots formed in a second end of the adapter body in correspondence with a pair of blades and a pair of earth terminals protruding from the power plug. The pair of blades is insertable into the pair of blade slots. The earth terminal is insertable into the terminal slot. The pair of blade slots allows insertion of the pair of blades. The pair of terminal slots allows insertion of the pair of earth terminals. The blade slots in the adapter body are arranged on a first reference line passing through a center of the adapter body in a radial direction. The terminal slots in the adapter body are arranged symmetrical with respect to a second reference line that is orthogonal to the first reference line passing through the center of the adapter body in the radial direction.

The adapter according to the above aspect is placed between the power outlet and the power plug to connect them in a reliable manner More specifically, when the power outlet has its terminal slot in an upper part of its plug-in surface, the adapter is plugged in the power outlet with its earth terminal being upward. When the power outlet has its terminal slot in a bottom part of its plug-in surface, the adapter is plugged in the power outlet with its earth terminal being downward.

More specifically, the adapter can be plugged in the power outlet with its earth terminal being either upward or downward without changing the arrangement of the pair of blade slots and the pair of terminal slots in the adapter. The power plug can be plugged in the power outlet, without turning the power plug upside down.

The adapter can thus be placed between the power outlet and the power plug to electrically connect the power outlet and the power plug when a pair of blades and a pair of earth terminals protruding from the power plug are unfit with the pair of blade slots and the terminal slot formed in the power outlet.

Further, the power plug can be inserted into the adapter, which is plugged in the power outlet, with its cable extending downward when the power plug has its cable connected to a peripheral portion of the power plug that is opposite to where the earth terminal protrudes, and extending orthogonal to the protruding direction of the earth terminal.

This structure prevents breakage of a wire contained in the cable, or prevents the electrical resistance in the wire from increasing, and thus achieves stable conductivity.

This structure can further reduce the load applied to the power plug or to the cable, and thus prevents the adapter from being unintentionally disconnected from the power outlet or prevents the power plug from being unintentionally disconnected from the adapter.

This structure allows the power outlet and the power plug to remain electrically connected.

In some embodiments, the terminal slots in the adapter body may be sized and shaped to each allow insertion of either one of the earth terminals protruding from the power plug. One of the earth terminals protruding from the power plug may have a substantially circular section. The other one of the earth terminals protruding from the power plug may have a substantially rectangular section.

The adapter according to the above aspect is placed between the power outlet and the power plug to connect them in a more reliable manner.

More specifically, either the earth terminal with the substantially circular section protruding from the power plug or the earth terminal with the substantially rectangular section protruding from the power plug can be inserted into each of the terminal slots formed in the adapter when the adapter is plugged in the power outlet with its earth terminal either being upward or downward.

The power plug can thus be inserted into the adapter, which is plugged in the power outlet, in a reliable manner without turning the power plug upside down.

In some embodiments, the adapter body may have a back end (as the second end) facing a front end of a plug body included in the power plug, and may have, on the back end, one of a mating part and a counter mating part that are to be mated with each other, and the plug body may have, on the front end, the other one of the mating part and the counter mating part.

The adapter according to the above aspect allows reliable connection to the power plug.

More specifically, for example, the mating part included in the front end of the plug body in the power plug is mated with the counter mating part included in the back end of the adapter body in the adapter to fix the mating part and the counter mating part together through mating.

This structure can fix the power plug and the adapter together through mating without rattling.

This structure enables reliable connection of the pair of blades and the pair of earth terminals protruding from the power plug inserted into the pair of blade slots and the pair of terminal slots in the adapter.

In some embodiments, the mating part and the counter mating part may include wall surfaces facing each other. One of the wall surfaces may include a ridge and the other one of the wall surfaces may include a groove that is engageable with the ridge.

The adapter according to the above aspect allows accurate connection to the power plug.

More specifically, when the mating part in the plug body is mated with the counter mating part in the adapter body, a pair of ridges included in one of the facing wall surfaces of the mating part and the counter mating part is engaged with a pair of grooves included in the other one of the facing wall surfaces. The power plug and the adapter are mated with each other as they are guided in the mating direction.

This structure prevents, in a reliable manner, relative rotation of the mating part in the power plug to the counter mating part in the adapter about the axis, or misalignment of the blades and the earth terminals in the power plug inserted into the blade slots and the terminal slots in the adapter.

This structure enables accurate connection of the pair of blades and the pair of earth terminals protruding from the power plug to the pair of blade slots and the pair of terminal slots formed in the adapter.

When the grooves are arranged differently from the ridges, one of the wall surfaces can come in contact with the ridges in the other wall surface to prevent mating between the power plug and the adapter. This structure prevents, in a reliable manner, any nonstandard power plug that cannot be used with the adapter from accidentally being inserted into and connected to the adapter.

In some embodiments, the counter mating part may have an inner wall surface having flat abutments at facing positions in a radial direction, and the mating part may have an outer wall surface having flat abutments arranged at facing positions in the radial direction. The flat abutments included in the counter mating part and the flat abutments included in the mating part may abut against each other in the radial direction when the counter mating part and the mating part are mated with each other.

The adapter according to the above aspect allows more accurate connection to the power plug.

More specifically, when the mating part in the power plug is mated with the counter mating part in the adapter body, the flat abutments at the facing positions of the wall surface of the mating part and the flat abutments at the facing positions of the wall surface of the counter mating part abut against each other. The power plug and the adapter are mated with each other as they are guided in the mating direction.

This structure prevents, in a more reliable manner, relative rotation of the mating part in the power plug to the counter mating part in the adapter about the axis, or misalignment of the blades and the earth terminals in the power plug inserted into the blade slots and the terminal slots in the adapter.

This structure enables more accurate connection of the pair of blades and the pair of earth terminals protruding from the power plug inserted at right angles into the pair of blade slots and the pair of terminal slots in the adapter.

In some embodiments, the adapter body may include, in a middle of a front end (as the first end) of the adapter body, a protrusion protruding frontward from the first end, and the protrusion contains the pair of protruding blades and the protruding earth terminal. The protrusion may be sized and shaped to be insertable into a protrusion-receiving recess formed on a front surface of the power outlet.

The protrusion and the protrusion-receiving recess described above may be, for example, substantially circular, substantially oval, or substantially polygonal.

The adapter according to the above aspect can be connected to the power outlet in an electrically stable manner.

More specifically, when, for example, the power plug is plugged in the power outlet installed outdoors, the adapter is plugged in the power outlet by inserting the middle protrusion on the front end of the adapter into the protrusion-receiving recess formed on the front surface of the power outlet.

This structure prevents entry of water, such as rainwater, through a gap between the first end of the adapter and the plug-in surface of the power outlet, because the protrusion inserted in the protrusion-receiving recess can easily guide such water to drip along the peripheral surface of the protrusion and prevent water from entering the electrically connected portion.

This structure prevents, for example, corrosion or electric leakage in the electrically connected portion between the adapter and the power outlet, and enables stable power supply.

In some embodiments, the adapter body may include a peripheral portion of a back end facing a peripheral portion of a front end of a plug body included in the power plug. The adapter body may have one of an engagement part and a counter engagement part on an edge of the peripheral portion. The plug body may have the other one of the engagement part and the counter engagement part on an edge of the peripheral portion. The counter engagement part and the engagement part are to be engaged with each other.

The above engagement part may be, for example, a lock bar or a lock lever including an engaging tab. The counter engagement part may be, for example, an engaging slot or an engaging groove that allows engagement with the engaging tab.

The adapter according to the above aspect can thus be connected to the power plug in a more reliable manner.

More specifically, when the mating part in the power plug is mated with the counter mating part in the adapter to electrically connect the power plug to the adapter, a pair of engagement parts included in one of the facing edges of the mating part and the counter mating part are engaged with a pair of counter engagement parts included in the other one of the facing edges.

This structure firmly fixes the power plug and the adapter together through mating between the power plug and the adapter without rattling, unlike when the mating part in the power plug is simply mated with the counter mating part in the adapter.

This structure allows the power plug and the adapter to remain electrically connected in a more reliable manner.

The power plug remains connected to the adapter until the engagement part is disengaged from the counter engagement part. This prevents accidental electrical disconnection. The engagement part is simply disengaged from the counter engagement part to easily disconnect the power plug from the adapter.

Further, the adapter can be plugged in the power outlet with its earth terminal being either upward or downward, without changing the arrangement of the engagement part and the counter engagement part. The power plug can thus be inserted into the adapter in a reliable manner, without turning the power plug upside down.

The adapter according to embodiments of the present invention is placed between the power outlet and the power plug to electrically connect the power outlet and the power plug.

BRIEF DESCRIPTION OF THE DRAWINGS

FIGS. 1A and 1B are external views of an adapter according to one embodiment of the present invention;

FIG. 3 is a sectional view of the adapter taken along A-A in FIG. 2B as viewed in the direction of the arrows;

DETAILED DESCRIPTION

One embodiment of the present invention will now be described with reference to the drawings.

FIGS. 1A and 1B are external views of an adapter 1 according to the present embodiment of the present invention. FIG. 1A is a perspective front view of the adapter 1 as viewed from right, and FIG. 1B is a perspective back view of the adapter 1 as viewed from left.

Figure 2A:
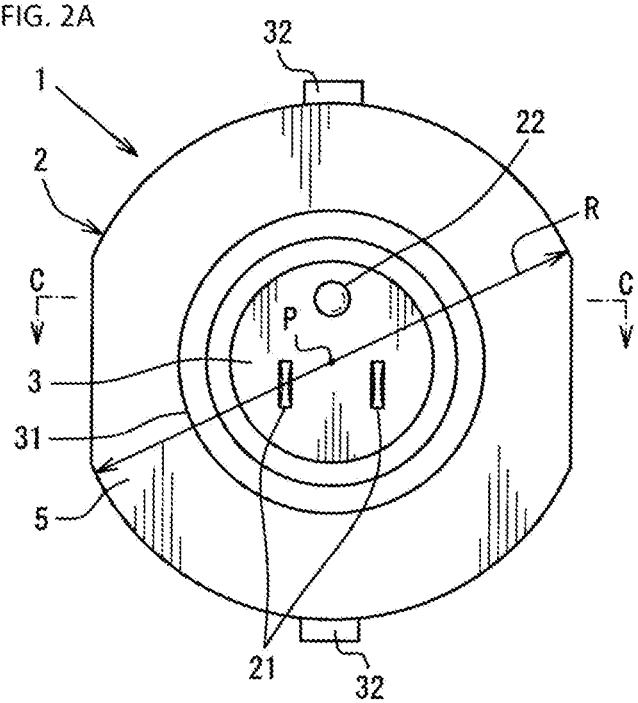
FIG. 2A is an external view of a front end of the adapter.
Figure 2B:
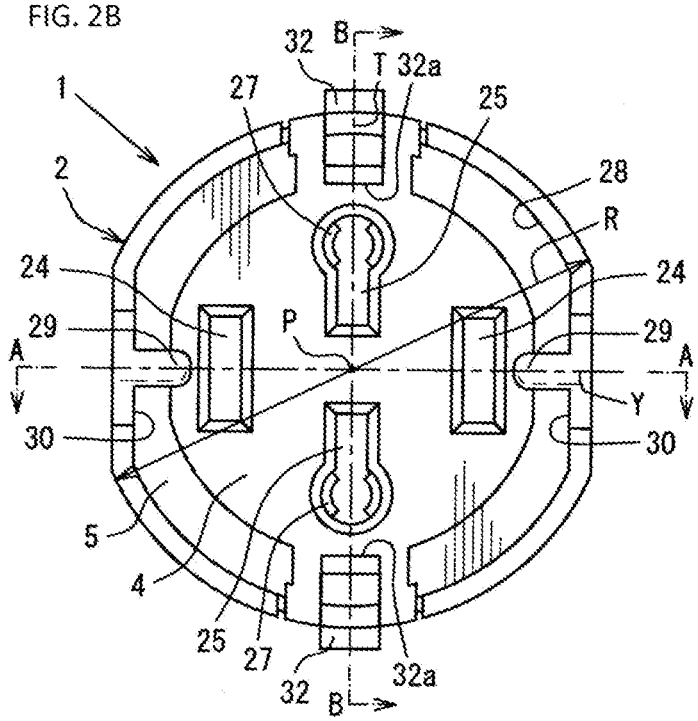
FIG. 2B is an external view of a back end of the adapter.
Figure 4:
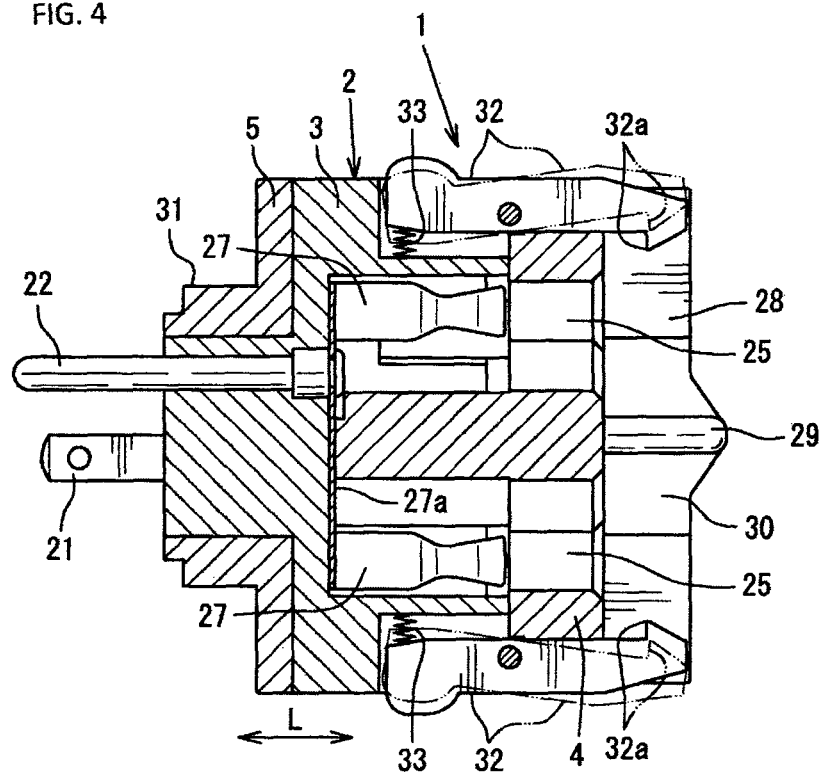
FIG. 4 is a sectional view of the adapter taken along B-B in FIG. 2B as viewed in the direction of the arrows.
Figure 5:
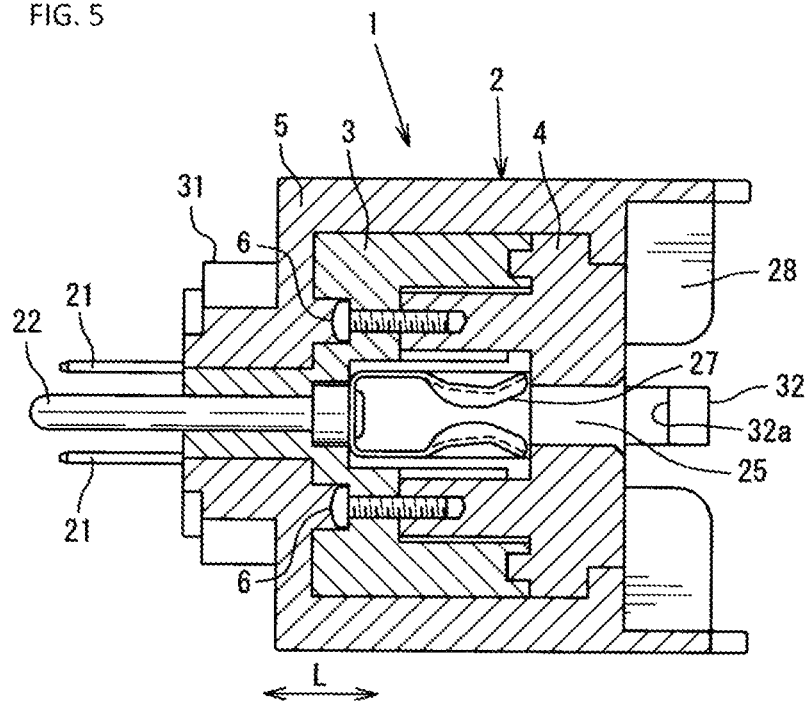
FIG. 5 is a sectional view of the adapter taken along C-C in FIG. 2A as viewed in the direction of the arrows.

FIGS. 2A and 2B are external views of a front end and a back end of the adapter 1. FIG. 2A is a front view of the adapter 1, and FIG. 2B is a back view of the adapter 1. FIG. 3 is a sectional view of the adapter 1 taken along A-A in FIG. 2B as viewed in the direction of the arrows. FIG. 4 is a sectional view of the adapter 1 taken along B-B in FIG. 2B as viewed in the direction of the arrows. FIG. 5 is a sectional view of the adapter 1 taken along C-C in FIG. 2A as viewed in the direction of the arrows.

Figure 6:
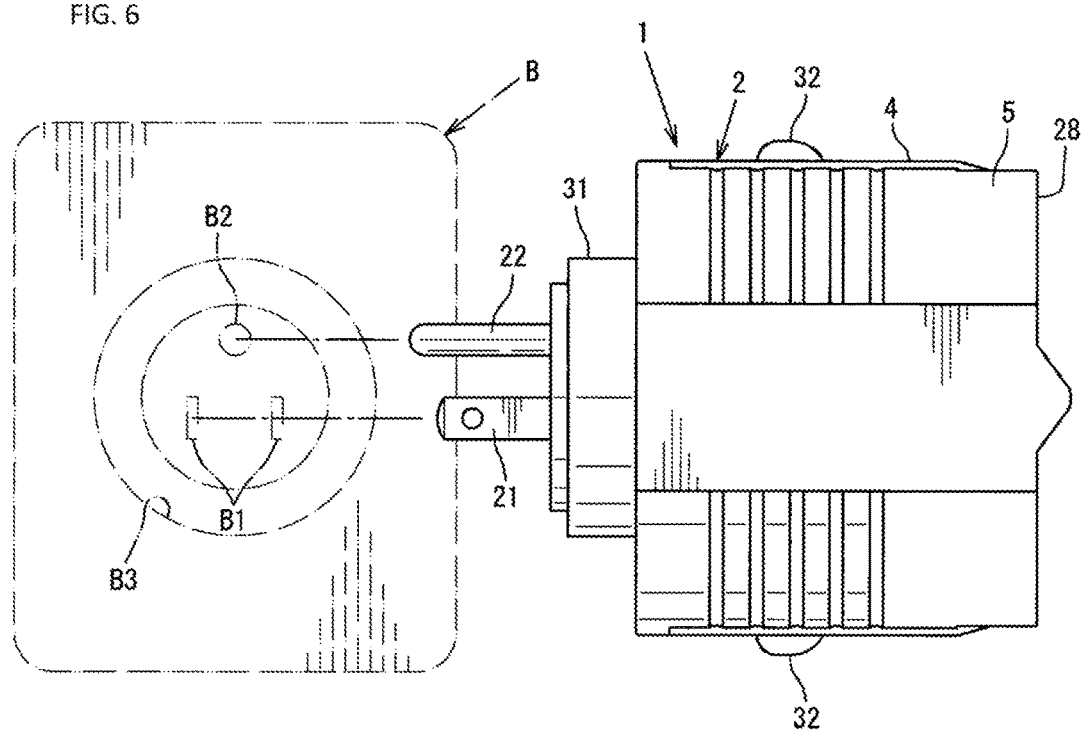
FIG. 6 is a diagram describing the adapter to be plugged in a power outlet.
Figure 7:
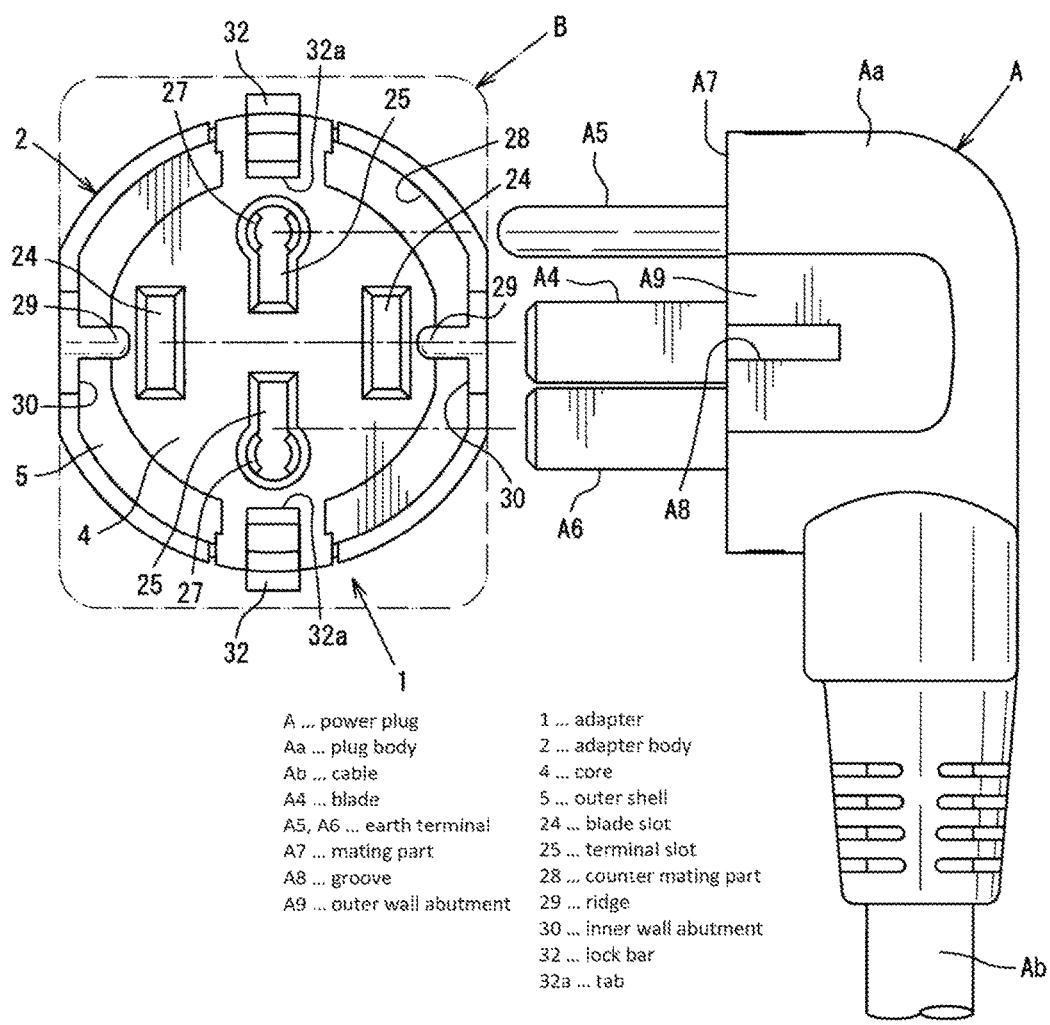
FIG. 7 is a diagram describing a power plug to be inserted into the adapter.
Figure 8:
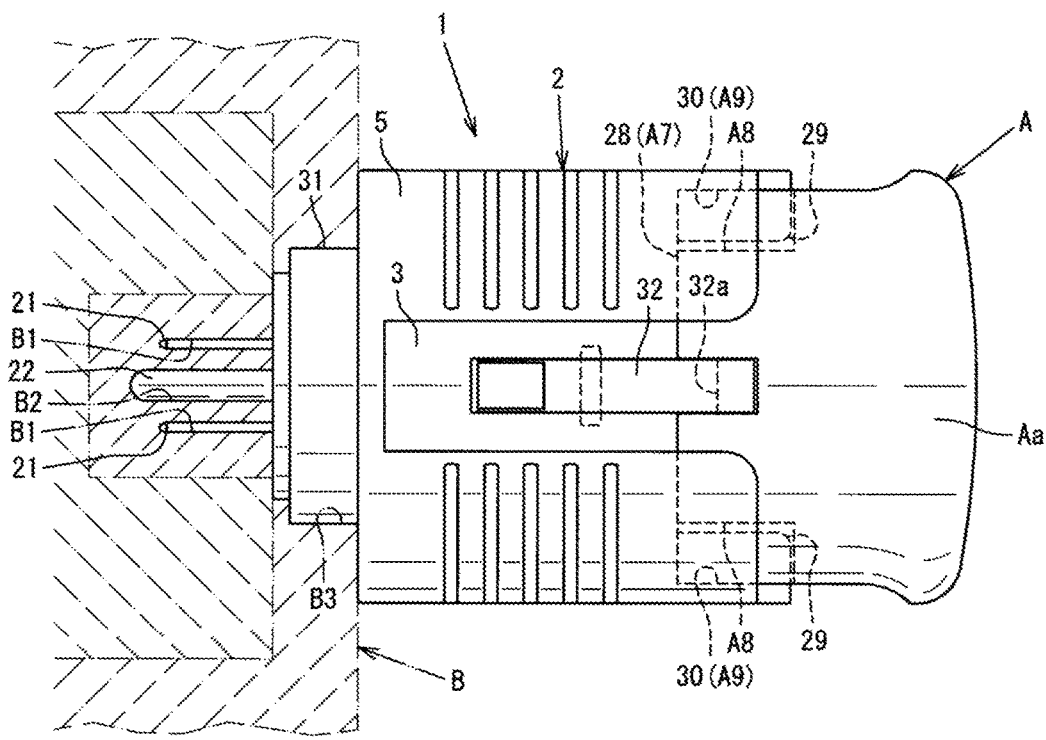
FIG. 8 is a plan view of the power plug connected to the power outlet via the adapter.

FIG. 6 is a diagram describing the adapter 1 to be plugged in a power outlet B. FIG. 7 is a diagram describing a power plug A to be inserted in the adapter 1. FIG. 8 is a plan view of the power plug A plugged in the power outlet B via the adapter 1.

Figure 9:
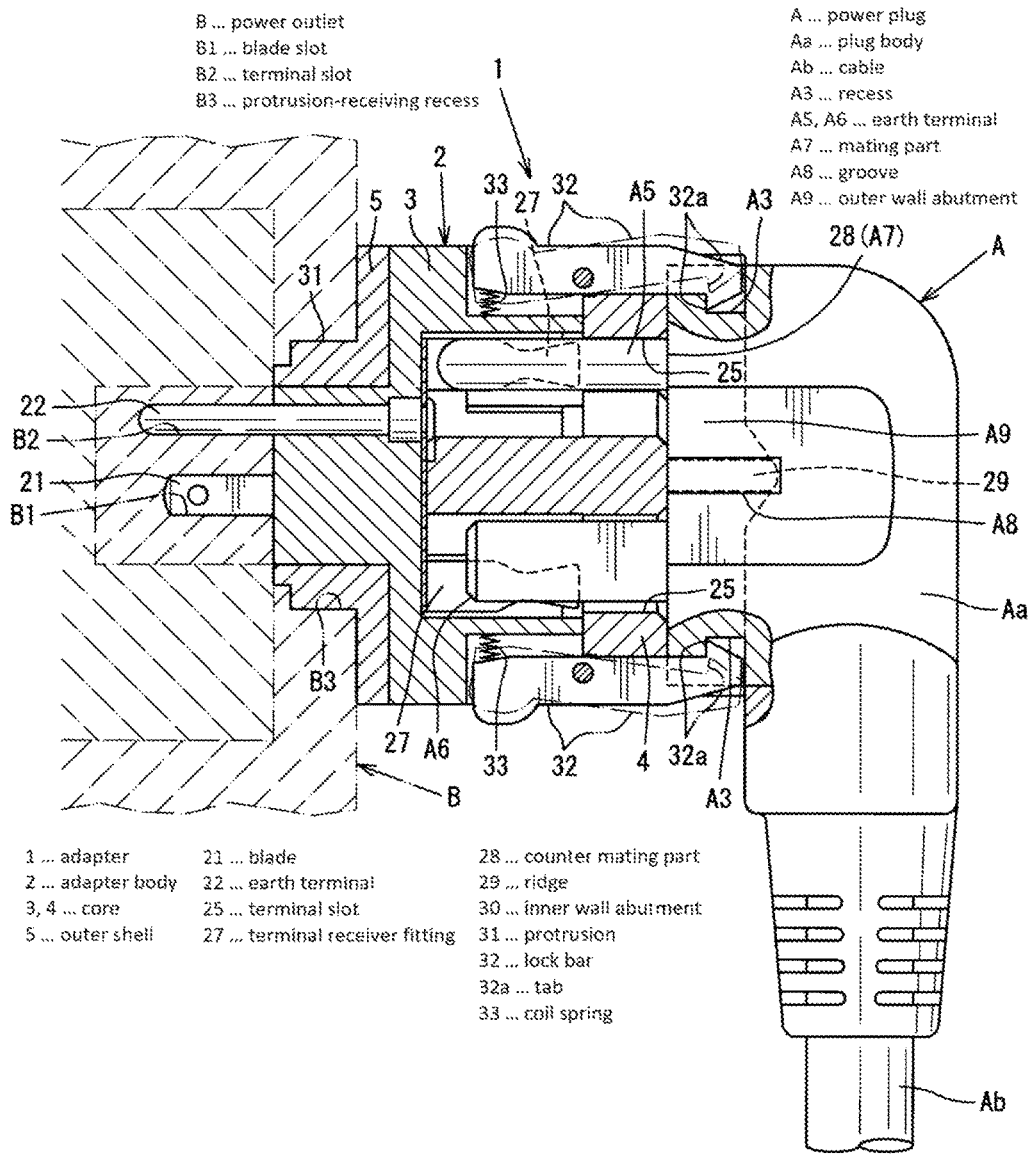
FIG. 9 is a sectional view of the adapter plugged in the power outlet without turning the adapter upside down.
Figure 10:
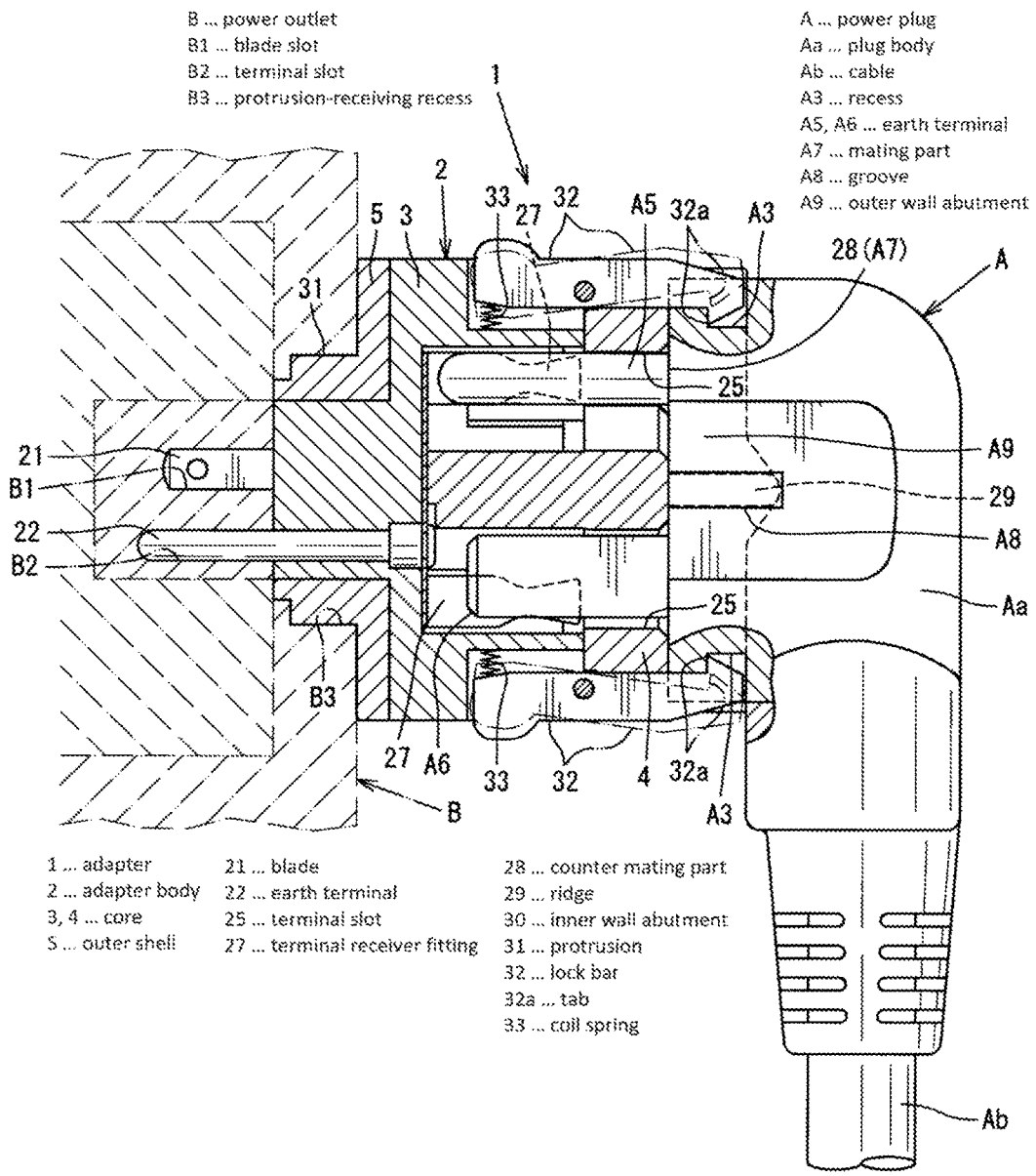
FIG. 10 is a sectional view of the adapter turned upside down and plugged in the power outlet.
Figure 11:
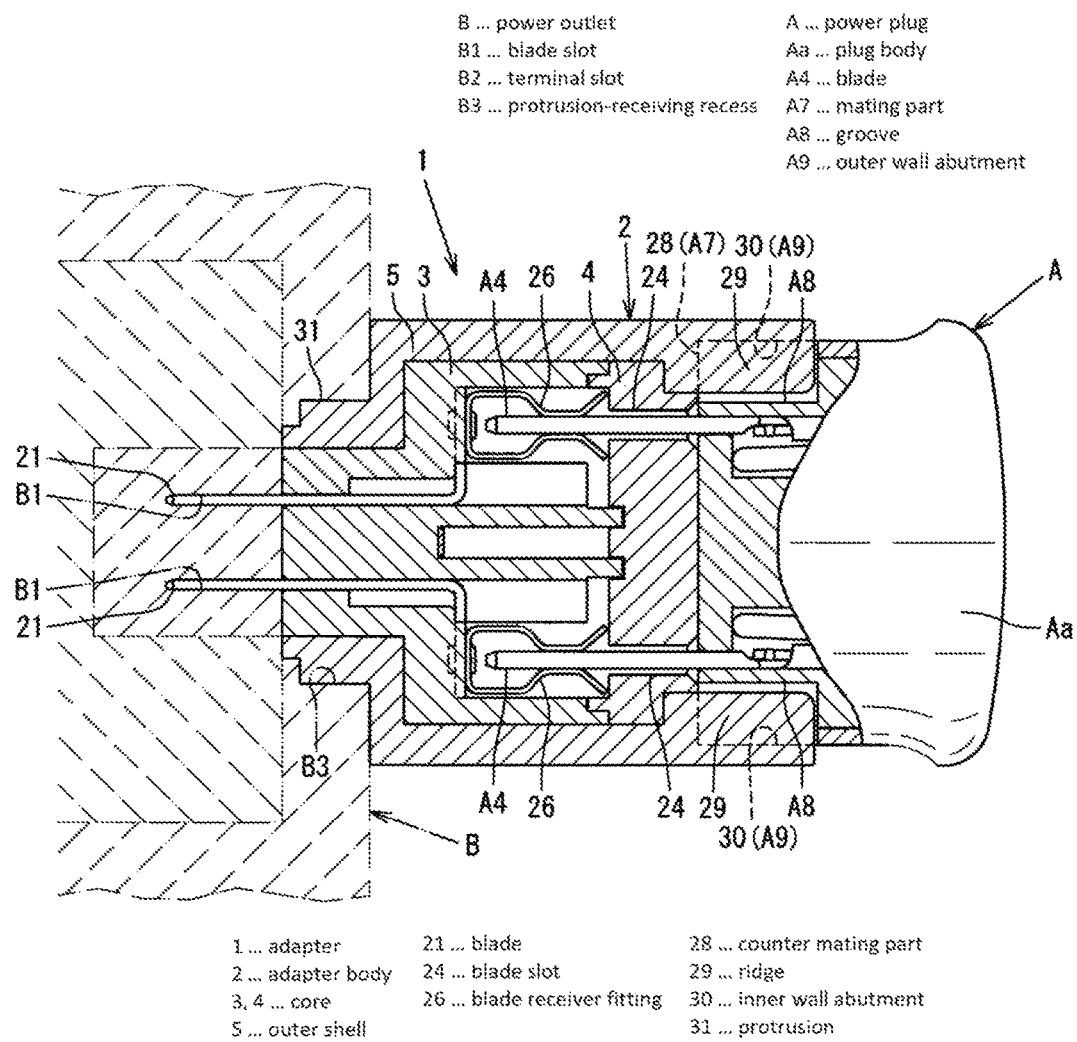
FIG. 11 is a sectional view of the adapter with its pair of blades inserted into the power outlet.
Figure 12:
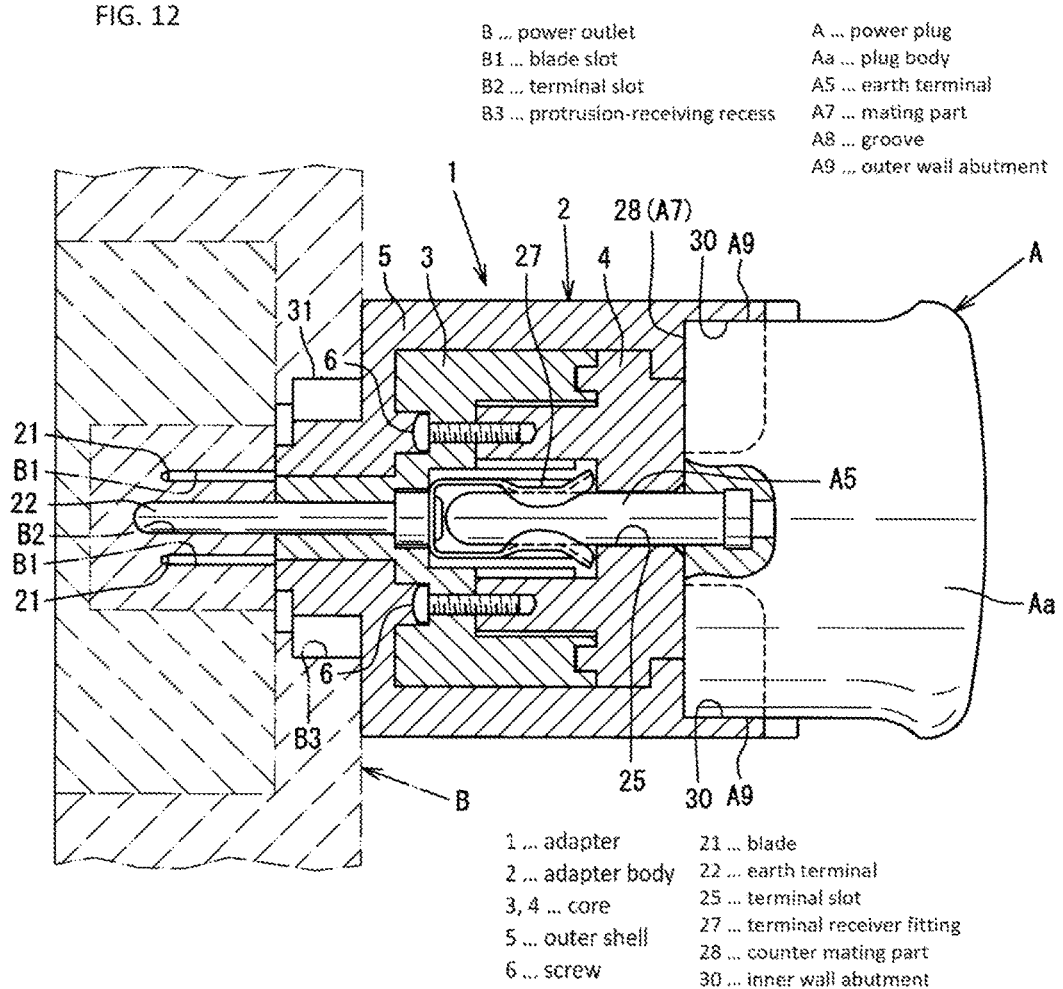
FIG. 12 is a sectional view of the adapter with its earth terminal inserted into the power outlet.

FIG. 9 is a sectional view of the adapter 1 plugged in the power outlet B without turning the adapter 1 upside down. FIG. 10 is a sectional view of the adapter 1 turned upside down and plugged in the power outlet B. FIG. 11 is a sectional view of the adapter 1 with its pair of blades 21 inserted into the power outlet B. FIG. 12 is a sectional view of the adapter 1 with its earth terminal 22 inserted into the power outlet B.

A longitudinal direction L herein refers to the longitudinal direction of the adapter 1. A radial direction R herein refers to the direction of a section parallel to a plane orthogonal to the longitudinal direction L. The adapter 1 has its front end to be inserted into the power outlet B, and its back end allowing insertion of the power plug A.

The adapter 1 according to the embodiment of the present invention is used for the power plug A that is unfit in the power outlet B, or specifically the power plug A having a pair of blades A4 and a pair of earth terminals A5 and A6 protruding from the plug A unfit with a pair of blade slots B1 and a terminal slot B2 formed in the power outlet B. The adapter 1 is placed between the power plug A and the power outlet B to electrically connect the power plug A and the power outlet B (refer to FIGS. 1A to 7).

The power plug A is a 4-pin plug including a plug body Aa and a cable Ab. The plug body Aa has the pair of blades A4 with a substantially rectangular section protruding from the middle of its front end (refer to FIG. 7).

The plug body Aa has the earth terminal A5 with a substantially circular section protruding from the upper middle of its front end. The plug body Aa has the earth terminal A6 with a substantially rectangular section protruding from the lower middle of its front end. The cable Ab is connected to a peripheral portion of the body Aa that is opposite to where the earth terminal A5 protrudes, and extends orthogonal to the protruding direction of the earth terminal A5 (refer to FIG. 7).

The power outlet B is designed to allow insertion of a 3-pin power plug (not shown). The power outlet B includes, in its plug-in surface, a pair of blade slots B1, into which the pair of blades 21 protruding from the front end of the adapter 1 is inserted and connected electrically, and a terminal slot B2, into which the earth terminal 22 is inserted and connected electrically (refer to FIG. 6).

The above adapter 1 includes a substantially cylindrical adapter body 2. The adapter body 2 includes a front core 3 including the pair of blades 21 and the single earth terminal 22 protruding from its front end, a back core 4 including a pair of blade slots 24 and a pair of terminal slots 25 on its back end, and an outer shell 5 covering the peripheries of the cores 3 and 4 (refer to FIGS. 1A to 5).

The pair of blades 21 and the single earth terminal 22 protrude in the longitudinal direction L from the front end of the core 3 included in the adapter body 2 (refer to FIGS. 2A to 5), in correspondence with the pair of blade slots B1 and the single terminal slot B2 formed in the plug-in surface of the power outlet B shown in FIG. 6.

The pair of blade slots 24 and the pair of terminal slots 25 extend in the longitudinal direction L with respect to the back end of the back core 4 included in the adapter body 2 (refer to FIGS. 2A to 5), in correspondence with the pair of blades A4 and the earth terminals A5 and A6 protruding from the front end of the power plug A shown in FIG. 7.

The cores 3 and 4 are formed from melamine resin. These cores 3 and 4 have mutually corresponding sizes and shapes. The outer shell 5 is formed from vinyl chloride, and covers the entire peripheries of the cores 3 and 4, which are fastened with two screws 6. The core 3 has a middle portion in its front end uncovered with the outer shell 5. The core 4 has a back end uncovered with the outer shell 5 (refer to FIGS. 2A to 5).

The pair of blades 21, which has an interval equal to the interval of the pair of blade slots B1 formed in the plug-in surface of the power outlet B shown in FIG. 6, is located lower than a center P of the front end of the core 3 in the radial direction R. The earth terminal 22 is located in the middle of the front end of the core 3 and higher than the center P in the radial direction R (refer to FIG. 2A), in correspondence with the terminal slot B2 in the power outlet B.

The pair of blade slots 24, which has an interval equal to the interval of the pair of blades A4 protruding from the front end of the power plug A shown in FIG. 7, is arranged on a first horizontal reference line Y passing through the center P of the core 4 in the radial direction R, and is arranged laterally symmetrical with respect to a second vertical reference line T, which is orthogonal to the first reference line Y passing through the center P of the core 4 in the radial direction R (refer to FIG. 2B).

The pair of terminal slots 25, which has an interval equal to the interval between the earth terminals A5 and A6 protruding from the front end of the power plug A shown in FIG. 7, is arranged on the second vertical reference line T passing through the center P of the core 4 in the radial direction R, and is arranged vertically symmetrical with respect to the first reference line Y, which is orthogonal to the second reference line T passing through the center P of the core 4 in the radial direction R (refer to FIG. 2B).

The two terminal slots 25 are vertically symmetrical to each other. The mechanism of insertion for one terminal slot 25 will be described. Each terminal slot 25 is sized and shaped to allow insertion of each of the earth terminals A5 and A6 (refer to FIG. 2B).

The terminal slot 25 has, at a position near the center P of the core 4, a portion that is sized and shaped to allow insertion of the earth terminal A6. The terminal slot 25 has, at a position away from the center P of the core 4, a portion that is sized and shaped to allow insertion of the earth terminal A5. The portion of the terminal slot 25 for receiving the earth terminal A6 and the portion of the terminal slot 25 for receiving the earth terminal A5 are continuous with each other in the radial direction R (refer to FIG. 2B).

The core 3 includes, in correspondence with the blade slots 24, blade receiver fittings 26 for connecting the blades A4 of the power plug A. The blade receiver fittings 26 are arranged laterally symmetrical to each other and facing the pair of blade slots 24. The pair of blade receiver fittings 26 connects to the base ends of the blades 21 inserted into the core 3 to allow conduction between them (refer to FIG. 3).

The core 3 includes, in correspondence with the terminal slots 25, terminal receiver fittings 27 for connecting the earth terminal A5 or A6 of the power plug A. The terminal receiver fittings 27 are arranged vertically symmetrical to each other and facing the pair of terminal slots 25 (refer to FIGS. 4 and 5).

Each of the two terminal receiver fittings 27 is sized and shaped to allow insertion of either of the earth terminal A5 or A6. The terminal receiver fittings 27 are connected integrally at their base ends with a connecting plate 27a. The connecting plate 27a connects to the base end of the earth terminal 22 inserted through the core 3 to allow conduction between them (refer to FIGS. 4 and 5).

The adapter body 2 in the adapter 1 includes, in correspondence with a mating part A7 included in the front end of the plug body Aa in the power plug A shown in FIG. 7, a substantially cylindrical counter mating part 28 on its back end, which is to be mated with the mating part A7. The counter mating part 28 and the mating part A7 have mutually corresponding sizes and shapes (refer to FIGS. 1B, 2B, and 3).

The counter mating part 28 includes, on its facing positions of the inner wall surface in the radial direction R, a pair of ridges 29 protruding inward in the radial direction R and extending parallel to the longitudinal direction L in correspondence with a pair of grooves A8 formed at facing positions of the outer wall surface of the mating part A7 in the radial direction R. The pair of ridges 29 is to be engaged with the pair of grooves A8.

The pair of ridges 29 is arranged on the first reference line Y passing through the center P of the adapter body 2 in the radial direction R, and arranged laterally symmetrical with respect to the second reference line T passing through the center P of the adapter body 2 in the radial direction R.

The counter mating part 28 also includes, on its facing positions of the inner wall surface having the ridges 29, substantially flat inner wall abutments 30, in correspondence with substantially flat outer wall abutments A9 formed at facing positions of the outer wall surface of the mating part A7. The inner wall abutments 30 are to abut against the outer wall abutments A9 in the radial direction R.

The adapter body 2 includes a protrusion 31 protruding frontward from the middle of its front end, in correspondence with a substantially circular protrusion-receiving recess B3 formed on the front surface of the power outlet B shown in FIGS. 6 and 8. The protrusion 31 is to be placed in the protrusion-receiving recess B3.

The protrusion 31 is substantially circular as viewed from the front, in correspondence with the protrusion-receiving recess B3. The protrusion 31 includes the pair of blades 21 and the earth terminal 22 protruding from its front end (refer to FIGS. 1A, 2A, and FIGS. 3 to 5).

The adapter body 2 includes a pair of lock bars 32, which is pivotally mounted on a peripheral portion of its back end, in correspondence with a pair of recesses A3 included in a peripheral portion of the front end of the plug body Aa in the power plug A shown in FIGS. 8 and 9. The pair of lock bars 32 is to be engaged with the pair of recesses A3.

The pair of lock bars 32 is arranged on the second reference line T, and is vertically symmetrical with respect to the first reference line Y (refer to FIGS. 1B, 2B, and 4).

Each of the lock bars 32 includes a tab 32a on its tip, which is to be engaged in the recess A3 in the plug body Aa. The lock bar 32 has a coil spring 33 arranged at its base end.

The coil spring 33 pivotally urges the lock bar 32 in a direction that causes the tab 32a to be engaged in the recess A3 (as indicated with solid lines in FIG. 4).

A method for electrically connecting the power plug A and the power outlet B with the adapter 1 described above placed between them will now be described.

When the power outlet B installed as appropriate has its terminal slot B2 in an upper part of its plug-in surface, the adapter 1 is plugged in the power outlet B with its earth terminal 22 being upward (refer to FIGS. 6 to 9).

When the power outlet B has its terminal slot B2 in a bottom part of its plug-in surface, the adapter 1 is plugged in the power outlet B with its earth terminal 22 being downward (refer to FIG. 10).

The pair of blades 21 and the earth terminal 22 protruding from the adapter 1 can thus be inserted into and connected electrically to the pair of blade slots B1 and the terminal slot B2 in the power outlet B.

When the adapter 1 is plugged in the power outlet B, the protrusion 31 on the adapter 1 is placed in the protrusion-receiving recess B3 formed on the front surface of the power outlet B (refer to FIGS. 9 and 10).

When the power plug A is inserted into the adapter 1, the pair of lock bars 32 is pivotally urged against the coil spring 33 in the disengaging direction (as indicated with two-dot chain lines in FIG. 9) to allow the mating part A7 in the power plug A to mate with the counter mating part 28 in the adapter 1.

The pair of ridges 29 in the counter mating part 28 in the adapter 1 is engaged with the pair of grooves A8 in the mating part A7 in the power plug A, and the pair of abutments 30 in the counter mating part 28 is abutted against the pair of abutments A9 in the mating part A7. This allows the power plug A and the adapter 1 to be guided in the longitudinal direction L, so as to be mated with each other.

When the mating part A7 in the power plug A is mated with the counter mating part 28 in the adapter 1, the pair of lock bars 32 is pivotally urged in the engaging direction under a biasing force exerted by the coil spring 33, and the tabs 32a in the lock bars 32 are engaged in the recesses A3 in the power plug A (as indicated with solid lines in FIG. 9).

The adapter 1 described above may be plugged in the power outlet B with its earth terminal 22 being either upward or downward, without changing the arrangement of the pair of blade slots 24 and the pair of terminal slots 25 in the adapter 1.

More specifically, the pair of blade slots 24 is arranged laterally symmetrical with respect to the second reference line T, whereas the pair of terminal slots 25 is arranged vertically symmetrical with respect to the first reference line Y. In this arrangement, the power plug A may not be turned upside down to have a cable Ab extending upward when the power outlet B has a terminal slot B2 in a bottom part of its plug-in surface.

The adapter 1, which is placed between the power plug A and the power outlet B, can thus electrically connect the power plug A and the power outlet B when the power plug A has the pair of blades A4 and the pair of earth terminals A5 and A6 protruding from the power plug A that are unfit with the pair of blade slots B1 and the terminal slot B2 in the power outlet B.

The power plug A can be inserted into the adapter 1, which is plugged in the power outlet B, with its cable Ab extending downward. This prevents breakage of a wire (not shown) included in the cable Ab of the power plug A, or prevents the electrical resistance in the wire from increasing, and thus achieves stable conductivity.

This structure can further reduce the load applied to the power plug A or to the cable Ab, and thus prevents the adapter 1 from being unintentionally disconnected from the power outlet B or prevents the power plug A from being unintentionally disconnected from the adapter 1.

This structure allows the power plug A and the power outlet B to remain electrically connected.

When the power plug A is inserted into the adapter 1, the pair of ridges 29 in the counter mating part 28 is engaged with the pair of grooves A8 in the mating part A7, and the pair of abutments 30 in the counter mating part 28 is abutted against the pair of abutments A9 in the mating part A7.

This structure prevents, in a reliable manner, relative rotation of the mating part A7 in the power plug A to the counter mating part 28 in the adapter 1 about the axis, or misalignment of the pair of blades A4 and the earth terminals A5 and A6 protruding from the power plug A inserted into the pair of blade slots 24 and the pair of terminal slots 25 in the adapter 1.

This structure enables more accurate connection of the pair of blades A4 and the pair of earth terminals A5 and A6 protruding from the power plug A inserted at right angles into the pair of blade slots 24 and the pair of terminal slots 25 in the adapter 1.

When the ridges 29 included in the counter mating part 28 are arranged differently from the grooves A5 in the mating part A7, the ridges 29 in the counter mating part 28 can come in contact with the peripheral wall of the mating part A7 to disable mating between the power plug A and the adapter 1. This structure prevents, in a reliable manner, any nonstandard power plug A that cannot be used with the adapter 1 from accidentally being inserted into the adapter 1, and enables reliable connection of a standard power plug A to the adapter 1.

When the mating part A7 in the power plug A and the counter mating part 28 in the adapter 1 are mated with each other, the tabs 32a in the lock bars 32 mounted on the adapter 1 are engaged in the upper and lower recesses A3 included in the power plug A.

This structure firmly fixes the power plug A and the adapter 1 together through mating between the power plug A and the adapter 1 without rattling, unlike when the mating part A7 in the power plug A is simply mated with the counter mating part 28 in the adapter 1.

This structure allows the power plug A and the adapter 1 to remain electrically connected in a more reliable manner.

The power plug A remains connected to the adapter 1 until the pair of lock bars 32 is pivotally urged in the disengaging direction to disengage the tabs 32a in the lock bars 32 from the recesses A3 in the power plug A. This prevents accidental electrical disconnection. The tabs 32a in the lock bars 32 are simply disengaged from the recesses A3 in the power plug A to easily disconnect the power plug A from the adapter 1.

Further, the adapter 1 may be turned upside down to have its earth terminal 22 being either upward or downward without changing the arrangement of the pair of lock bars 32 that is pivotally mounted on the adapter 1 and the pair of recesses A3 included in the power plug A. The power plug A can thus be inserted into the adapter 1 in a reliable manner, without turning the power plug A upside down.

The adapter 1 is plugged in the power outlet B by placing the middle protrusion 31 on the front end of the adapter 1 in the protrusion-receiving recess B3 formed on the front surface of the power outlet B.

This structure prevents entry of water, such as rainwater, through a gap between the front end of the adapter 1 and the plug-in surface of the power outlet B when the power plug A is plugged in the power outlet B installed outdoors, because the protrusion 31 placed in the protrusion-receiving recess B3 can easily guide such water to drip along the peripheral surface of the protrusion 31 and prevent any water from entering the plugged-in portion.

This prevents, for example, corrosion or electric leakage at the connection between the adapter 1 and the power outlet B, and enables stable power supply.

The claimed components and the components in the above embodiments correspond to each other in the manner described below.

The claimed engagement part corresponds to the lock bar 32 in the embodiment.

Similarly, a counter engagement part corresponds to the recess A3.

The present invention is not limited to the structures described in the above embodiment, and may have other applications based on the technical ideas defined by the appended claims, and many other embodiments may be contemplated.

Although the above embodiment describes the method for plugging the L-shaped power plug A in the power outlet B, the adapter 1 according to one or more embodiments of the present invention can be used for plugging any power plug A other than the L-shaped plug in the power outlet B.

REFERENCE SIGNS LIST

L longitudinal direction
R radial direction
P center
Y first reference line
T second reference line
A power plug
Aa plug body
Ab cable
A3 recess
A4 blade
A5, A6 earth terminal
A7 mating part
A8 groove
A9 outer wall abutment
B power outlet
B1 blade slot
B2 terminal slot
B3 protrusion-receiving recess
1 adapter
2 adapter body
3, 4 core
5 outer shell
6 screw
21 blade
22 earth terminal
24 blade slot
25 terminal slot
26 blade receiver fitting
27 terminal receiver fitting
28 counter mating part
29 ridge
30 inner wall abutment
31 protrusion
32 lock bar
32a tab
33 coil spring

The invention claimed is:

1. An adapter, comprising:
an adapter body to be placed between a power outlet and a power plug to electrically connect the power outlet and the power plug;
a pair of blades and an earth terminal protruding from a first end of the adapter body in correspondence with a pair of blade slots and a terminal slot formed in the power outlet, the pair of blades being insertable into the pair of blade slots, the earth terminal being insertable into the terminal slot; and
a pair of blade slots and a pair of terminal slots formed in a second end of the adapter body in correspondence with a pair of blades and a pair of earth terminals protruding from the power plug, the pair of blade slots being configured to allow insertion of the pair of blades, the pair of terminal slots being configured to allow insertion of the pair of earth terminals,
wherein electric power is supplied from the pair of blade slots to the pair of blades,
the blade slots in the adapter body are arranged on a first reference line passing through a center of the adapter body in a radial direction,
the blade slots in the adapter body are arranged symmetrically with respect to a second reference line that is orthogonal to the first reference line and passes through the center of the adapter body in a radial direction,
each of the blade slots has a symmetrical shape with respect to the first reference line,
the shapes of the blade slots in the adapter body are symmetrical to each other with respect to the second reference line,
the terminal slots in the adapter body are arranged symmetrically with respect to the first reference line,
each of the terminal slots has a symmetrical shape with respect to the second reference line, and
the shapes of the terminal slots in the adapter body are symmetrical to each other with respect to the first reference line.

2. The adapter according to claim 1, wherein
the terminal slots in the adapter body are sized and shaped to each allow insertion of either one of the earth terminals protruding from the power plug, one of the earth terminals protruding from the power plug has a substantially circular section, and the other one of the earth terminals protruding from the power plug has a substantially rectangular section.

3. The adapter according to claim 1, further comprises:
a mating part disposed at the second end and configured to be mated with a counter mating part disposed at a front end of a plug body included in the power plug.

4. The adapter according to claim 3, wherein
the mating part and the counter mating part include wall surfaces facing each other, and one of the wall surfaces includes a ridge and the other one of the wall surfaces includes a groove that is engageable with the ridge.

5. The adapter according to claim 3, wherein
the counter mating part has an inner wall surface having flat abutments at facing positions in a radial direction, and the mating part has an outer wall surface having flat abutments arranged at facing positions in the radial direction, and
the flat abutments included in the counter mating part and the flat abutments included in the mating part abut against each other in the radial direction when the counter mating part and the mating part are mated with each other.

6. The adapter according to claim 1, wherein
the adapter body includes, in a middle of the first end of the adapter body, a protrusion protruding frontward from the first end, and the protrusion contains the pair of protruding blades and the protruding earth terminal, and
the protrusion is sized and shaped to be insertable into a protrusion-receiving recess formed on a front surface of the power outlet.

7. The adapter according to claim 1, wherein
the adapter body includes a peripheral portion of the second end facing a peripheral portion of a front end of a plug body included in the power plug, and the adapter body has one of an engagement part and a counter engagement part on an edge of the peripheral portion, the plug body has the other one of the engagement part and the counter engagement part on an edge of the peripheral portion, and the counter engagement part and the engagement part are to be engaged with each other.

* * * * *